United States Patent Office 3,082,669
Patented Mar. 26, 1963

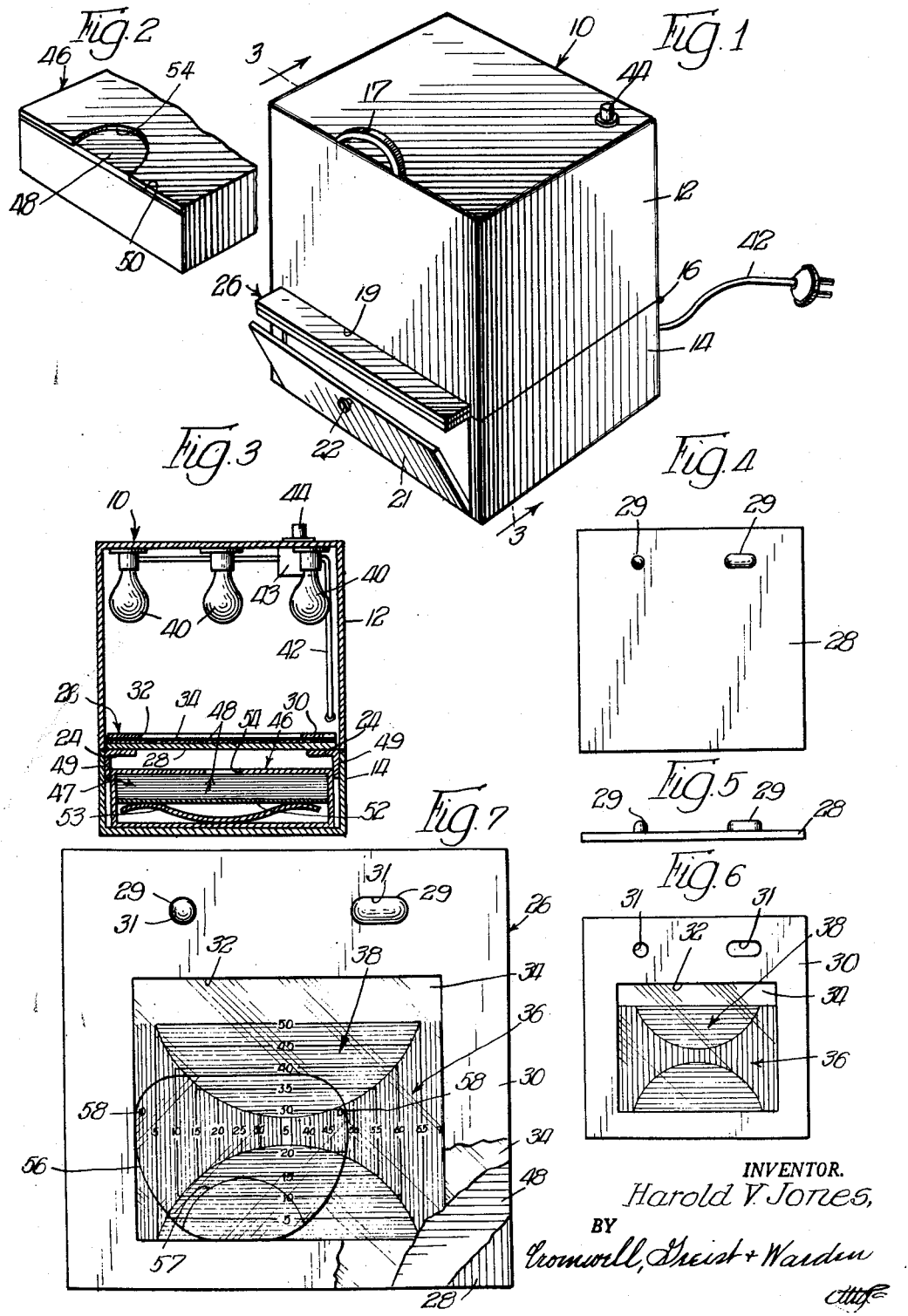

3,082,669
APPARATUS FACILITATING ACCURATE REPRODUCTION OF EYEGLASS LENSES
Harold V. Jones, 120 N. Walnut St., Champaign, Ill.
Filed June 26, 1961, Ser. No. 119,625
14 Claims. (Cl. 95—1.1)

The present invention relates to an apparatus which facilitates accurate duplication of eyeglass lenses.

It is very often necessary for an oculist, ophthalmologist, or optometrist to order a replacement lens or lenses for a patient's eyeglasses from optical laboratories, supply houses, etc., which replacement lens must be an accurate duplication as to physical dimensions and characteristics so that it will fit in the patient's existing eyeglass frames. Until the development of the apparatus disclosed herein, there has been no practical method for accurately conveying the necessary specifications to the optical laboratory or supply house. Such crude methods as tracing the lens to be duplicated or haphazard measuring thereof have been used by oculists and other eye specialists to provide optical labs., etc. with specifications for duplicating a lens. As would be expected, therefore, a substantial number of supposedly duplicate lenses prepared from such crude specifications have not fitted the existing eyeglass frames and have therefore been rejected by the oculist or other eye specialist.

It is, therefore, the general object of the present invention to provide a new and novel apparatus which facilitates accurate duplication of the phsical dimensions and characteristics of an eyeglass lens, which apparatus is economical to produce and may therefore be acquired at relatively low cost by oculists, optometrists, etc. for office use, and which apparatus is extremely simple to operate in a matter of seconds whereby to provide accurate physical specifications for a replacement lens, which specifications may then be forwarded to an optical laboratory or supply house with an order for a replacement lens.

Another important object of the present invention is to provide a new and improved apparatus of the character described which provides a pictorial set of specifications of the physical dimensions and characteristics of an eyeglass lens in the form of a photograph of the lens to be duplicated superimposed on a calibrated scale or graph sheet, which photograph, either in undeveloped or developed condition, may be forwarded to an optical laboratory or supply house with a lens replacement order whereby to permit accurate duplication of the physical dimensions and characteristics of the original lens, including location of bi-focal inserts and drilled holes or notches for mounting purposes.

A more detailed object of the present invention is to provide a new and novel apparatus of the character described including a box-like casing having one or more lamps provided in the upper portion thereof, which lamps are energizable for a predetermined time period by a manually operable timer-switch, and a plate assembly insertable into the casing beneath the lamps through a suitable slot in the front wall of the casing, which plate assembly is characterized by a base plate and an upper plate having a window opening therein and a transparent sheet secured to the underside thereof with calibrated scales provided on the portion thereof extending across the window opening, whereby a photograph or pictorial representation of the lens to be duplicated superimposed on the calibrated scales may be provided by energizing the lamps when the lens to be duplicated is properly oriented in the window opening and a sheet of photo-sensitized paper is sandwiched between the two plates of the plate assembly.

A further object of the present invention is to provide a new and novel apparatus of the character described wherein a dispenser containing a stack of sheets of photo-sensitized paper is provided in the lower portion of the box-like casing beneath the slot through which the plate assembly is inserted with access to the dispenser being provided by a readily openable closure member hingedly mounted in the front wall of the lower portion of the box-like casing.

Certain other objects of the invention will, in part, be obvious, and will in part appear hereinafter.

For a more complete understanding of the nature and scope of the invention reference may now be had to the accompanying drawings wherein:

FIG. 1 is a perspective view looking toward the front side of an apparatus embodying the invention with the plate assembly being shown in its operable position in the casing and with the closure member for gaining access to the photo-sensitized paper dispenser being shown in a partially opened condition;

FIG. 2 is a fragmentary perspective view looking toward the front side of the photo-sensitized paper dispenser;

FIG. 3 is a reduced-in-scale vertical section taken generally on the line 3—3 of FIG. 1;

FIG. 4 is a top plan view of the base plate of the plate assembly shown in FIG. 3;

FIG. 5 is an edgewise view of the base plate of FIG. 4 looking toward the front edge thereof;

FIG. 6 is a top plan view of the upper plate of the plate assembly; and

FIG. 7 is an enlarged top plan view of the plate assembly progressively broken away at the lower right-hand corner whereby to show the transparent scale sheet, a sheet of photo-sensitized paper, and the base plate and also showing the calibrated scales on the scale sheet and a typical eyeglass lens disposed in the window opening in the upper plate and properly positioned or oriented relative to the calibrated scales.

As illustrated in FIG. 1, a preferred embodiment of the apparatus includes a box-like casing 10 which is characterized by an upper portion 12 and a separate lower portion 14. The upper and lower portions 12 and 14 are hingedly connected together at the rear of the casing 10 by a known type hinge 16 which is connected between the lower edge of the rear wall of the upper portion 12 and the upper edge of the rear wall of the lower portion 14. A handle 17 may be provided at the front edge of the top wall of the upper casing portion 12 to facilitate opening the casing 10.

The lower edge of the front wall of the upper casing portion 12 is provided with a cut-away portion extending substantially between the side edges thereof whereby to define a longitudinally extending notch or slot 19. The front wall of the lower casing portion 14 is cut away substantially between the side edges thereof with the opening defined thereby being provided with a closure or door member 21 which is hingedly connected at its lower edge to the front edge of the bottom wall of the lower casing portion 14 in a known manner. Preferably, this hinge connection includes spring members which serve to resiliently retain the closure member 21 in its closed position. A knob 22 prvoided on the closure member 21 facilitates opening thereof.

As best illustrated in FIG. 3, a pair of angular supporting rails 24 are secured in a known manner to the upper portions of the inner surfaces of the side walls of the lower casing portion 14 with the upper supporting surfaces thereof being generally horizontally aligned with the upper edges of the side walls of the lower casing portion 14. Preferably, the supporting rails 24 extend the full length of the side walls of the lower casing portion 14.

A plate assembly 26 having vertical and horizontal dimensions slightly less than the corresponding dimensions of the slot 19 is adapted to be slidably inserted into the box-like casing 10 through the slot 19 for supporting engagement on the rails 24. As illustrated in FIG. 1, the front edge of the plate assembly 26 is adapted to project slightly outwardly through the slot 19 whereby to facilitate manual gripping thereof. As shown in FIGS. 3–7, the plate assembly 26 is characterized by a base plate member 28 (FIGS. 4 and 5) having a pair of raised projections or upstanding pins 29 provided near the rear edge portion thereof and an upper plate member 30 which is removably fitted over the base plate member 28 and is provided with a pair of openings 31 formed near the rear edge portion thereof for receiving the raised projections 29 on the base plate member 28 whereby the two plate members are readily vertically separable.

The upper plate member 30 is further characterized by a generally centrally located rectangular window opening 32 which extends therethrough. A transparent scale or graph sheet 34, which may be formed of plastic or the like, is secured by means of a suitable adhesive to the underside of the upper plate member 30. The portion of the transparent sheet 34 extending across the window opening 32 is provided with a pair of calibrated scales 36 and 38 which are disposed normally to each other with their zero ordinates aligned with a pair of intersecting side edges of the window opening 32. As best illustrated in FIG. 7, in the illustrated embodiment of the invention the horizontally disposed scale 36 is calibrated from 0 to 70 millimeters with its zero ordinate being aligned with the left-hand side edge of the window opening 32 and the vertically disposed sclae 38 is calibrated from 0 to 50 millimeters with its zero ordinate being aligned with the lower or front edge of the window opening 32.

The apparatus also includes illuminating means mounted in the upper casing portion 12 above the slot 19 and the supporting rails 24. In the embodiment of the invention illustrated in FIG. 3, four lamps 40 are suspended from the underside of the top wall of the upper casing portion 12 with each lamp 40 being located adjacent a vertical wall of the upper casing portion 12 approximately midway between the side edges thereof. The lamps 40 are connected by suitable wiring to a power cord 42 which is adapted to be plugged into a suitable electrical outlet and to an adjustable timer-switch 43 of a known type having a manually depressible actuating button 44 extending upwardly through the top wall of the upper casing portion 12. When the button 44 is depressed and released, all of the lamps 40 will be energized for a predetermined time period, which time period may be adjusted.

A dispenser 46, FIGS. 2 and 3, containing a stack 47 of sheets of photo-sensitized paper 48 is disposed in the lower casing portion 14 behind the closure member 21. The dispenser 46 is supported directly on the bottom wall of the lower casing portion 14 and is removably fitted between depending leg portions 49 of the angular supporting rails 24. The dispenser 46, which is characterized by top, bottom, front, rear and side walls, is provided with a narrow horizontally extending exit slot 50 which is formed in the front wall thereof immediately below the top wall whereby to permit the removal of a sheet of photo-sensitized paper 48 therethrough. The stack 47 of sheets of photo-sensitized paper 48 is supported on a floating plate member 52 disposed in the dispenser. The plate member 52 is resiliently urged upwardly toward the top wall of the dispenser 46 by a spring member 53 which is disposed between the bottom wall of the dispenser and the underside of the floating plate member 52 whereby the uppermost sheet 48 in the stack 47 is retained against the underside of the top wall of the dispenser 46 in alignment with the exit slot 50. The front edge of the top wall of the dispenser 46 is provided with a rearwardly extending finger opening 54 whereby to facilitate removal of the uppermost sheet of photo-sensitized paper 48 through the exit slot 50.

Use of the apparatus described herein by optometrists and other eye specialists in their own offices to provide a pictorial set of accurate specifications of the physical dimensions and characteristics of an eyeglass lens to facilitate accurate duplication thereof is extremely simple as will now be explained. First, the plate assembly 26 is removed from the slot 19 in the casing 10 and the upper plate member 30 is lifted off or vertically separated from the base plate 28. The closure member 21 is then opened and a sheet of photo-sensitized paper 48 is removed from the dispenser 46 and placed on the base plate 28. It is noted that the sheets of photo-sensitized paper 48 may be punched to accommodate the raised projections 29 on the base plate member 28. The upper plate member 30 is then replaced on the base plate member 28 whereby the sheet of photo-sensitized paper 48 is sandwiched between the plate members 28 and 30. An eyeglass lens 56 to be duplicated is then placed in the window opening 32 of the upper plate member 30 against the edges of the window opening 32 aligned with the zero ordinates of the normally disposed calibrated scales 36 and 38, as illustrated in FIG. 7. The particular lens 56 illustrated in FIG. 7 is provided with a bi-focal insert defined by the light line 57 and with a pair of drilled holes 58 used for mounting the lens 56 in its eyeglass frame. Some lenses may be provided with notches rather than drilled holes for mounting purposes. With the lens 56 to be duplicated so positioned in the window opening 32, the plate assembly 26 is slidably inserted into the casing 10 through the slot 19 whereby the plate assembly 26 is supported on the supporting rails 24. With the power cord 42 plugged into an electric outlet, the button 44 of the timer-switch 43 is depressed and released whereby to energize all of the lamps 40 for a predetermined time period. It has been found that a time period of 15 seconds is a sufficient exposure period for the sheet of photo-sensitized paper 48 whereby to provide a well defined photograph or pictorial representation of the lens 56 superimposed on the calibrated scales 36 and 38. The plate assembly 26 is then withdrawn from the casing 10 by gripping the projecting front edge thereof and the exposed sheet of photo-sensitized paper 48 is removed from between the plate members 28 and 30.

When any of the known brands of the developer are applied to the exposed sheet of photo-sensitized paper 48 there will be provided a clearly defined pictorial reproduction or photograph of the lens 56 superimposed upon the calibrated scales 36 and 38, thus providing a pictorial set of accurate specifications of the physical dimensions and characteristics of the lens 56 including the locations of the bi-focal insert 57 and the drilled holes 58. The exposed sheet of photo-sensitized paper 48 may be sent to the optical laboratory, etc. with a lens replacement order in either a developed or undeveloped condition or state. In the latter instance, the optical laboratory, etc. will apply the developer to the exposed sheet 48. As a result of the development of the apparatus disclosed herein, optical laboratories, etc. may be easily provided with accurate sets of specifications of the physical dimensions and characteristics of eyeglass lenses to be duplicated, thus insuring that the replacement lenses will fit the patient's existing eyeglass frames.

A modified version of the apparatus disclosed herein may have a developer tank provided in an extended portion of the casing as a component part of the unit, whereby to facilitate immediate development of an exposed sheet of photo-sensitized paper. The optometrist or other eye specialist can then ascertain immediately whether or not he has gotten a clear pictorial reproduction of the eyeglass lens properly superimposed on the scale sheet 34 for transmittal to the optical laboratory, etc.

It is noted that the exposure time may vary considerably in accordance with variations in the distance between the illuminating means and the sheet of photo-sensitized paper and in the light power of the illuminating means.

I claim:

1. Apparatus facilitating accurate duplication of eyeglass lenses comprising, a box-like casing, manually energizable illuminating means in the upper portion of said casing, and means for supporting an eyeglass lens to be duplicated in said casing beneath said illuminating means on a transparent sheet of material having calibrated scale means provided thereon, said transparent sheet of material overlying a sheet of unexposed photo-sensitized paper whereby when said illuminating means is energized an undeveloped photograph is made of said lens superimposed on said calibrated scale means, which photograph, when developed, provides a pictorial set of specifications of the physical dimensions and characteristics of said lens.

2. Apparatus facilitating accurate duplication of eyeglass lenses comprising, a box-like casing, a horizontal slot formed in the front wall of said casing and extending substantially the full width of said front wall, said slot being located in the lower portion of said front wall, a pair of laterally spaced support members disposed in said casing with the supporting surfaces thereof being horizontally aligned with the lower edge of said slot, a plate assembly slidably insertable into said casing through said slot and adapted to be supported on said support members, said plate assembly being characterized by a lower base plate, by an upper plate having a window opening formed therein, and by a transparent scale sheet secured against the underside of said upper plate and having calibrated scale means provided on the portion thereof extending across said window opening, and manually energizable illuminating means in the upper portion of said casing, said illuminating means being adapted to be energized when said plate assembly is disposed on said support members with a sheet of unexposed photo-sensitized paper sandwiched between said upper and lower plates and with an eyeglass lens to be duplicated disposed in said window opening in properly oriented relationship with said calibrated scale means whereby to provide an undeveloped photograph of said lens superimposed on said scale sheet and thus, when the photograph is developed, a pictorial set of specifications of the physical dimensions and characteristics of said lens.

3. Apparatus facilitating accurate duplication of eyeglass lenses comprising, a box-like casing, a horizontal slot formed in the front wall of said casing and extending substantially the full width of said front wall, said slot being located substantially below the top of said casing, a pair of laterally spaced support members disposed in said casing with the supporting surfaces thereof being horizontally aligned with the lower edge of said slot, a readily accessible dispenser containing a stack of sheets of unexposed photo-sensitized paper disposed in said casing beneath said support members, a plate assembly slidably insertable into said casing through said slot and adapted to be supported on said support members, said plate assembly being characterized by a lower base plate, by an upper plate having a window opening formed therein, and by a transparent scale sheet secured against the underside of said upper plate and having calibrated scale means provided on the portion thereof extending across said window opening, and manually energizable illuminating means in the upper portion of said casing substantially above said slot, said illuminating means being adapted to be energized when said plate assembly is disposed on said support members with one of said sheets of unexposed photo-sensitized paper from said dispenser sandwiched between said upper and lower plates and with an eyeglass lens to be duplicated disposed in said window opening in properly oriented relationship with said calibrated scale means whereby to provide an undeveloped photograph of said lens superimposed on said scale sheet and thus, when the photograph is developed, a pictorial set of specifications of the physical dimensions and characteristics of said lens.

4. Apparatus facilitating accurate duplication of eyeglass lenses comprising, a box-like casing, a horizontal slot formed in the front wall of said casing and extending substantially the full width of said front wall, said slot being located in the lower portion of said front wall, a pair of laterally spaced support members disposed in said casing with the supporting surfaces thereof being horizontally aligned with the lower edge of said slot, a plate assembly slidably insertable into said casing through said slot and adapted to be supported on said support members, said plate assembly being characterized by a lower base plate, by an upper plate having a generally rectangular window opening formed therein, and by a transparent scale sheet secured against the underside of said upper plate, the portion of said transparent scale sheet extending across said window opening having a pair of calibrated scales disposed normally to each other provided thereon with the zero ordinates of said scales being aligned with a pair of intersecting side edges of said rectangular window opening, illuminating means disposed in the upper portion of said casing, and timer-switch means adapted when actuated to energize said alluminating means for a predetermined time period, said timer-witch means being actuated to energize said illuminating means when said plate assembly is disposed on said support members with a sheet of unexposed photo-sensitized paper sandwiched between said upper and lower plates and with an eyeglass lens to be duplicated disposed in said window opening against said pair of intersecting side edges thereof whereby to provide an undeveloped photograph of said lens superimposed on said scale sheet and thus, when the photograph is developed, a pictorial set of specifications of the physical dimensions and characteristics of said lens including the location of any bi-focal insert and any drilled holes and notches used for mounting purposes.

5. Apparatus facilitating accurate duplication of eyeglass lenses comprising, a box-like casing, a horizontal slot formed in the front wall of said casing and extending substantially the full width of said front wall, said slot being located in the lower portion of said front wall, a pair of laterally spaced support members disposed in said casing with the supporting surfaces thereof being horizontally aligned with the lower edge of said slot, a readily openable closure member hingedly mounted in an opening formed in the front wall of said casing below said slot, a dispenser containing a stack of unexposed sheets of photo-sensitized paper disposed in the lower portion of said casing behind said closure member, a plate assembly slidably insertable into said casing through said slot and adapted to be supported on said support members, said plate assembly being characterized by a lower base plate, by an upper plate having a generally rectangular window opening formed therein, and by a transparent scale sheet secured against the underside of said upper plate, the portion of said transparent scale sheet extending across said window opening having a pair of calibrated scales disposed normally to each other provided thereon with the zero ordinates of said scales being aligned with a pair of intersecting side edges of said rectangular window opening, illuminating means disposed in the upper portion of said casing, and timer-switch means adapted when actuated to energize said illuminating means for a predetermined time period, said timer-switch means being actuated to energize said illuminating means when said plate assembly is disposed on said support members with one of said sheets of unexposed photo-sensitized paper from said dispenser sandwiched between said upper and lower plates and with an eyeglass lens to be duplicated disposed in said window opening against said pair of intersecting side edges thereof whereby to provide an undeveloped photograph of said lens superimposed on said scale sheet and thus, when the photograph is developed, a pictorial set of specifications of the physical dimensions and characteristics of said lens including the location of any bi-focal insert and any drilled holes and notches used for mounting purposes.

6. Apparatus facilitating accurate duplication of eyeglass lenses comprising, a box-like casing having separate upper and lower portions hingedly connected together at their abutting rear edges, a horizontal notch formed in the lower edge of the front wall of the upper casing portion and extending substantially between the side edges thereof, a pair of supporting rails secured to the inner surfaces of the side walls of the lower casing portion with the upper supporting surfaces thereof being horizontally aligned with the upper edges of the side walls of the lower casing portion, a plate assembly adapted to be slidably inserted into said casing through said notch for supporting engagement on said rails, the front edge of said plate assembly being adapted to project slightly outwardly through said notch to facilitate manual gripping thereof, said plate assembly being characterized by a lower base plate, by an upper plate having a generally rectangular window opening formed therein, and by a transparent scale sheet secured against the underside of said upper plate, the portion of said transparent scale sheet extending across said window opening having a pair of calibrated scales disposed normally to each other provided thereon with the zero ordinates of said scales being aligned with a pair of intersecting side edges of said window opening, and manually energizable lamp means disposed adjacent the underside of the top wall of said upper casing portion, said lamp means being adapted to be energized when said plate assembly is disposed on said supporting rails with a sheet of unexposed photo-sensitized paper sandwiched between said upper and lower plates and with an eyeglass lens to be duplicated disposed in said window opening against said pair of intersecting side edges thereof whereby to provide an undeveloped photograph of said lens superimposed on said scale sheet and thus, when the photograph is developed, a pictorial set of specifications of the physical dimensions and characteristics of said lens which may be forwarded to an optical laboratory or the like with an order for a replacement lens.

7. Apparatus facilitating accurate duplication of eyeglass lenses comprising, a box-like casing having separate upper and lower portions hingedly connected together at their abutting rear edges, a horizontal notch formed in the lower edge of the front wall of the upper casing portion and extending substantially between the side edges thereof, a pair of supporting rails secured to the inner surfaces of the side walls of the lower casing portion with the upper supporting surfaces thereof being horizontally aligned with the upper edges of the side walls of the lower casing portion, an opening of substantial size formed in the front wall of said lower casing portion, a dispenser containing a stack of sheets of unexposed photo-sensitized paper disposed in said lower casing portion beneath said supporting rails, said dispenser being readily accessible through said opening formed in the front wall of said lower casing portion, a readily openable closure member for said opening, a plate assembly adapted to be slidably inserted into said casing through said notch for supporting engagement on said rails, the front edge of said plate assembly being adapted to project slightly outwardly through said notch to facilitate manual gripping thereof, said plate assembly being characterized by a lower base plate, by an upper plate having a generally rectangular window opening formed therein, and by a transparent scale sheet secured against the underside of said upper plate, the portion of said transparent scale sheet extending across said window opening having a pair of calibrated scales disposed normally to each other provided thereon with the zero ordinates of said scales being aligned with a pair of intersecting side edges of said window opening, and manually energizable lamp means disposed adjacent the underside of the top wall of said upper casing portion, said lamp means being adapted to be energized when said plate assembly is disposed on said supporting rails with one of said sheets of unexposed photo-sensitized paper from said dispenser sandwiched between said upper and lower plates and with an eyeglass lens to be duplicated disposed in said window opening against said pair of intersecting side edges thereof whereby to provide an undeveloped photograph of said lens superimposed on said scale sheet and thus, when the photograph is developed, a pictorial set of specifications of the physical dimensions and characteristics of said lens which may be forwarded to an optical laboratory or the like with an order for a replacement lens.

8. Apparatus facilitating accurate duplication of eyeglass lenses comprising, a box-like casing having upper and lower portions hingedly connected together along their horizontally extending abutting rear edges, the lower edge of the front wall of the upper casing portion having a cut-away portion extending substantially between the side edges thereof whereby to define a horizontally extending notch, a pair of supporting rails secured to the inner surfaces of the side walls of the lower casing portion with the upper supporting surfaces thereof being horizontally aligned with the upper edges of the side walls of the lower casing portion, a plate assembly adapted to be slidably inserted into said casing through said notch for supporting engagement on said supporting rails with the front edge of said plate assembly being adapted to project slightly outwardly through said notch to facilitate manual gripping thereof, said plate assembly being characterized by a lower base plate, by an upper plate having a generally rectangular centrally located window opening formed therein, by a transparent scale sheet secured against the underside of said upper plate, and by interfitting means on said upper and lower plates permitting vertical separation thereof, the portion of said transparent scale sheet extending across said window opening having a pair of calibrated scales disposed normally to each other provided thereon with the zero ordinates of said scales being aligned with a pair of intersecting edges of said window opening, one or more lamps attached to the underside of the top wall of said upper casing portion, and a timer-switch adapted when actuated to energize said lamp or lamps for a predetermined time period, said timer-switch being adapted to be manually actuated when said plate assembly is disposed in said casing on said supporting rails with a sheet of unexposed photo-sensitized paper sandwiched between said upper and lower plates and with an eyeglass lens to be duplicated disposed in said window opening against said pair of intersecting edges thereof, whereby to provide a photograph of said lens superimposed on said scale sheet when developer is applied to the exposed sheet, thus providing an accurate pictorial set of specifications facilitating accurate duplication of the physical dimensions and characteristics of said lens.

9. Apparatus facilitating accurate duplication of eyeglass lenses comprising, a box-like casing having upper and lower portions hingedly connected together along their horizontally extending abutting rear edges, the lower edge of the front wall of the upper casing portion having a cut-away portion extending substantially between the side edges thereof whereby to define a horizontally extending notch, a pair of supporting rails secured to the inner surfaces of the side walls of the lower casing portion with the upper supporting surfaces thereof being horizontally aligned with the upper edges of the side walls of the lower casing portion, a substantial portion of the front wall of said lower casing portion being cut away with the opening defined therein being provided with a closure member hingedly connected along its lower edge to the front edge of the bottom wall of said lower casing portion, said hinge connection having spring means associated therewith whereby said closure member is resiliently urged into its closed position, a box-like dispenser containing a stack of sheets of photo-sensitized paper disposed in said lower casing portion beneath said supporting rails whereby a sheet of said photo-sensitized paper may be readily removed from said dispenser when said closure member is swung into its open position, a plate assembly adapted to be slidably inserted into said casing through said notch for supporting engagement on said rails, said plate assembly being characterized by a lower base plate, by an upper plate having a generally rectangular centrally located window opening formed therein, by a transparent scale sheet secured against the underside of said upper plate, and by interfitting means on said upper and lower plates permitting vertical separation thereof, the portion of said transparent scale sheet extending across said window opening having a pair of calibrated scales disposed normally to each other provided thereon with the zero ordinates of said scales being aligned with a pair of intersecting edges of said window opening, illuminating means attached to the underside of the top wall of said upper casing portion, and a timer-switch adapted when actuated to energize said illuminating means for a predetermined time period, said timer-switch being adapted to be manually actuated when said plate assembly is disposed in said casing on said supporting rails with one of said sheets of unexposed photo-sensitized paper sandwiched between said upper and lower plates and with an eyeglass lens to be duplicated disposed in said window opening against said pair of intersecting edges thereof, whereby to provide a photograph of said lens superimposed on said scale sheet when developer is applied to the exposed sheet, thus providing an accurate pictorial set of specifications facilitating accurate duplication of the physical dimensions and characteristics of said lens.

10. Apparatus facilitating accurate duplication of lens elements adapted for correcting and improving a person's vision comprising, a supporting structure, means for supporting a lens element to be duplicated on a transparent sheet of material supported on said supporting structure, said transparent sheet of material having calibrated scale means provided thereon, normally de-energized illuminating means mounted on said supporting structure above said lens element supporting means, and means for energizing said illuminating means, said transparent sheet of material overlying a sheet of unexposed photo-sensitized paper whereby when said illuminating means is energized an undeveloped photograph is made of said lens element superimposed on said calibrated scale means, which photograph, when developed, provides a pictorial set of specifications of the physical dimensions and characteristics of said lens element.

11. Apparatus facilitating accurate duplication of lens elements adapted for correcting and improving a person's vision comprising, a supporting structure, a plate member supported on said supporting structure and having a window opening formed therein, a transparent scale sheet disposed beneath said plate member and having calibrated scale means thereon disposed in registration with said window opening in said plate member, normally de-energized illuminating means mounted on said supporting structure above said plate member, and means for energizing said illuminating means, said plate member and said transparent scale sheet overlying a sheet of unexposed photo-sensitized paper whereby when said illuminating means is energized with a lens element to be duplicated disposed in said window opening of said plate member in properly oriented relationship with said calibrated scale an undeveloped photograph of said lens element superimposed on said scale sheet is provided, which photograph, when developed, provides a pictorial set of specifications of the physical dimensions and characteristics of said lens element.

12. Apparatus facilitating accurate duplication of lens elements adapted for correcting and improving a person's vision comprising, a supporting structure, a plate member supported on said supporting structure and having a rectangular window opening formed therein, a transparent scale sheet secured to the underside of said plate member, the portion of said transparent scale sheet disposed in registration with said window opening having a pair of calibrated scales disposed normally to each other provided thereon with the zero ordinates of said scales being aligned with a pair of intersecting edges of said rectangular window opening, normally de-energized illuminating means mounted on said supporting structure above said plate member, said plate member and said transparent scale sheet overlying a sheet of unexposed photo-sensitized paper, and means for energizing said illuminating means, said illuminating means being adapted to be energized when a lens element to be duplicated is disposed in said window opening of said plate member against said pair of intersecting edges thereof, whereby to provide an undeveloped photograph of said lens element superimposed on said scale sheet and thus, when the photograph is developed, a pictorial set of specifications of the physical dimensions and characteristics of said lens element including the location of any bi-focal insert and any drilled holes and notches used for mounting purposes.

13. Apparatus facilitating accurate duplication of lens elements adapted for correcting and improving a person's vision comprising, a supporting structure, a plate member supported on said supporting structure and having a rectangular window opening formed therein, a transparent scale sheet secured beneath said plate member, the portion of said transparent scale sheet extending across said window opening having a pair of calibrated scales disposed normally to each other provided thereon with the zero ordinates of said scales being aligned with a pair of intersecting side edges of said rectangular window opening, normally de-energized illuminating means mounted on said supporting structure above said plate member, said plate member and said transparent scale sheet overlying a sheet of unexposed photo-sensitized paper, and timer-switch means adapted when actuated to energize said illuminating means for a predetermined time period, said timer-switch means being adapted to be actuated to energize said illuminating means when a lens element to be duplicated is disposed in said window opening of said plate member against said pair of intersecting side edges thereof whereby to provide an undeveloped photograph of said lens element superimposed on said scale sheet and thus, when the photograph is developed, a pictorial set of specifications of the physical dimensions and chaarcteristics of said lens element.

14. Apparatus for facilitating accurate duplication of lens elements adapted for correcting and improving a person's vision comprising, a supporting structure, a plate member supported on said supporting structure and having a window opening formed therein, a transparent scale sheet secured beneath said plate member and having calibrated scale means provided on the portion thereof disposed in registration with said window opening in said plate member, normally de-energized illuminating means mounted on said supporting structure above said plate member, said plate member and said transparent scale sheet overlying a sheet of unexposed photo-sensitized paper, means for energizing said illuminating means, said illuminating means being adapted to be energized when a lens element to be duplicated is disposed in said window opening of said plate member in properly oriented relationship with said calibrated scale means whereby to provide an undeveloped photograph of said lens element superimposed on said scale sheet and thus, when the photograph is developed, a pictorial set of specifications of the physical dimensions and characteristics of said lens element, and a stack of sheets of photo-sensitized paper disposed in said supporting structure beneath said plate member and resiliently urged upwardly whereby to provide a ready supply thereof.

References Cited in the file of this patent

UNITED STATES PATENTS

| | | |
|---|---|---|
| 689,361 | Moe | Dec. 17, 1901 |
| 1,916,282 | Peacock | July 4, 1933 |
| 2,352,176 | Bolsey | June 27, 1944 |